June 17, 1941.  H. P. SCHRANK  2,246,479
PNEUMATIC TIRE STRUCTURE
Filed July 19, 1940   3 Sheets-Sheet 1
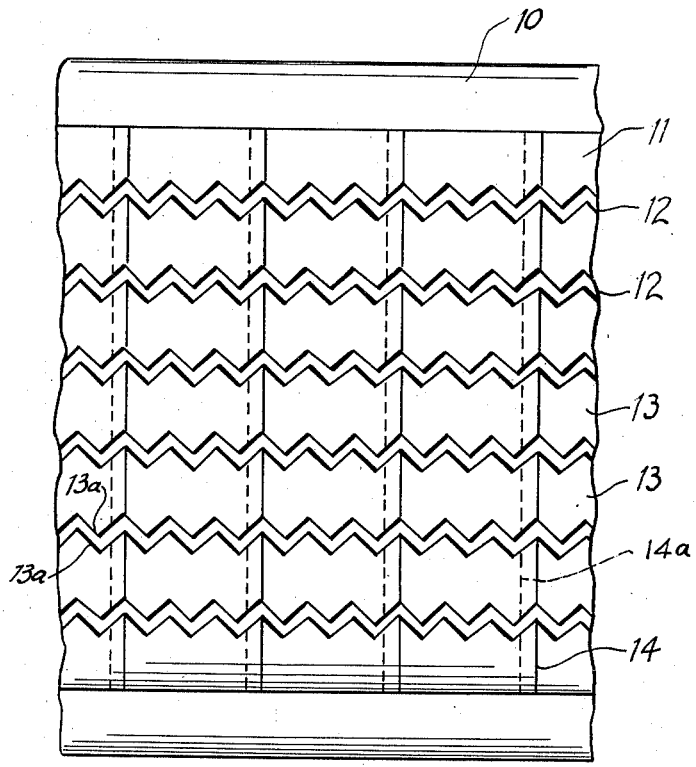
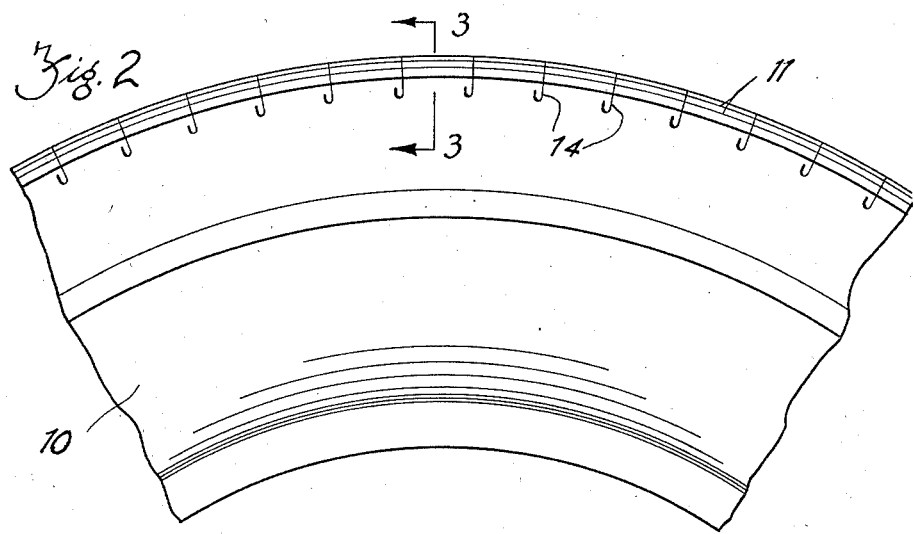
INVENTOR.
HARRY P. SCHRANK
BY
J. Ralph Barrow

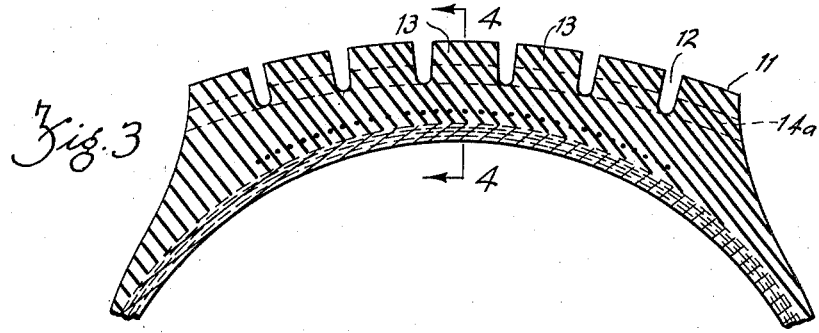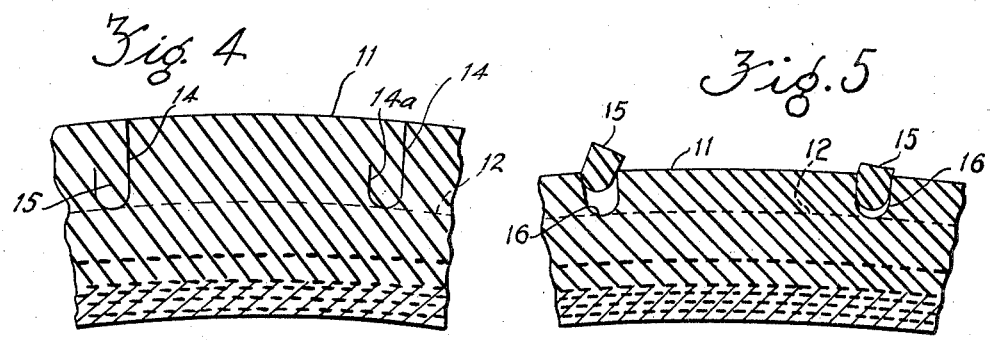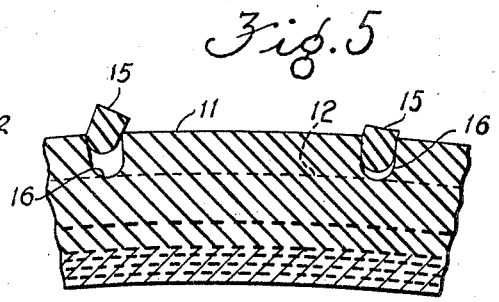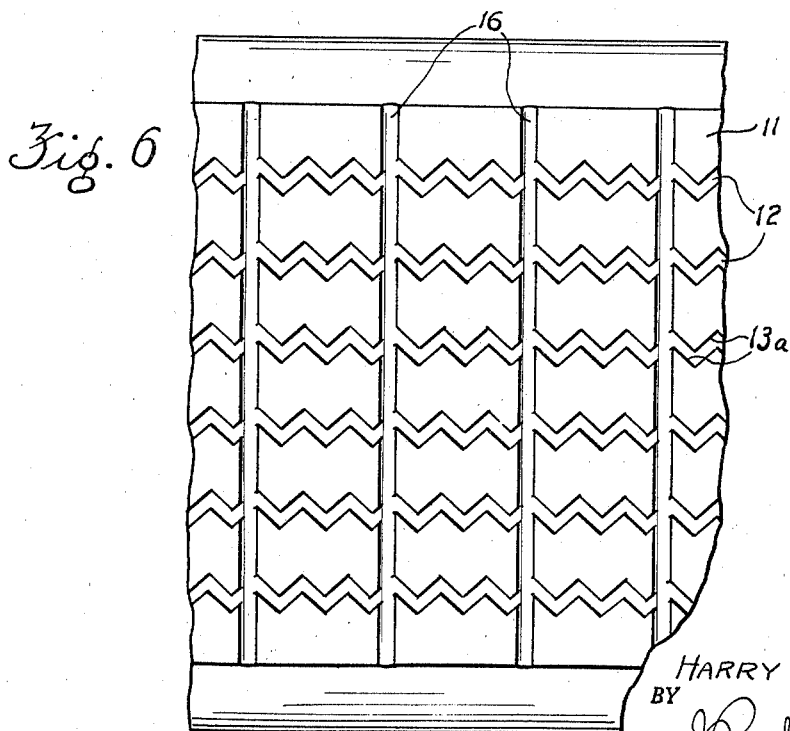

Patented June 17, 1941

2,246,479

UNITED STATES PATENT OFFICE 2,246,479

PNEUMATIC TIRE STRUCTURE

Harry P. Schrank, Munroe Falls, Ohio, assignor to Seiberling Rubber Company, Barberton, Ohio, a corporation of Ohio Application July 19, 1940, Serial No. 346,393

12 Claims. (Cl. 152—209)

This invention relates to pneumatic tire structures of vulcanized rubber or the like, and particularly to the treads thereof.

The characteristics of what are known in the art as slitted tread tires have led in the past to the provision of slits which extend only a fraction of the depth of the grooves defining the ribs or projections on the tread, and then the tread is reslit from time to time during the use of the tire to provide the desired anti-skid and traction qualities in the worn tire. This, of course, is an expensive and troublesome operation.

The chief purpose of this invention is to provide an improved tire having one or more continuous ribs or other projections formed with transverse slits, so shaped that when the tire wears down to a predetermined point, grooves are formed extending transversely of the tire to form additional free edges of rubber and to increase the flexibility of the projections defined by said grooves so as to maintain effective anti-skid and traction qualities throughout the wear of the tread, without requiring re-slitting or re-grooving or other operations to improve anti-skid and traction qualities of worn tires.

More particularly the invention has as its object the provision of tires with transversely extending slits of J-shape or inverted T-shape, arranged in such a way that at a predetermined depth in the tread, the rubber embraced by the arm or hook-shaped portion of the J, or by the arms of the T, will be automatically displaced from the tread, thereby leaving effective anti-skid grooves and resulting in increased flexibility of the worn tread to maintain substantial anti-skid and traction characteristics. Nevertheless, the rubber embraced in the hook-shaped portions of the slits is present during the initial wearing of the tire to carry the load and effectively distribute the load to the carcass, and adds stability to the tread.

The foregoing and other purposes of the invention are attained in the pneumatic tire casings illustrated in the accompanying drawings and described below.

Of the accompanying drawings:

Figure 1 is a fragmentary plan view of the tread of a tire casing embodying the invention.

Figure 2 is a fragmentary side elevation thereof.

Figure 3 is a radial section through the tread portion of the tire, taken on line 3—3 of Figure 2.

Figure 4 is an enlarged section along line 4—4 of Figure 3.

Figure 5 is a similar section showing how the rubber embraced by the arm of the J is automatically displaced from the tire when the tread wears down to a certain predetermined depth, to provide anti-skid grooves.

Figure 6 is a fragmentary plan view, similar to Figure 1, of the tire when it has worn to the condition shown in Figure 5, and after the rubber embraced in the hook-like portions of the J's has automatically been displaced.

Figure 7:
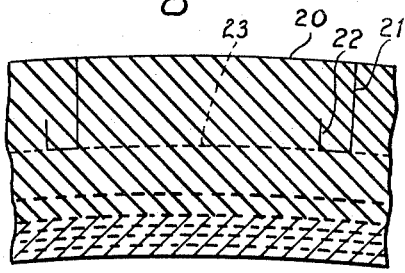
Figure 7 is a sectional view similar to Figure 4 showing a J-slit with a squared hook formation instead of the rounded J shown in Figures 1 to 6, inclusive.

Referring to Figures 1 to 6 of the drawings the numeral 10 designates a tire casing having a tread 11 which may be formed with grooves 12, 12 defining a plurality of circumferential ribs 13, 13 having serrated edges 13ª, 13ª. The tread 11 in accordance with the present invention is transversely slit, as by means of a suitably shaped knife-blade as will be understood by skilled artisans, to form slits of J-shape in the manner indicated in Figures 2 and 4 at 14, 14. The long side or trunk of the J provides slits inwardly from the surfaces of the tread to adjacent the bottoms of the grooves 12, and the arm or hooklike portion of the J, as indicated at 14ª, is rounded at the bottom thereof and has an upwardly extending portion terminating in spaced relation to the ground-engaging portion of the tread, whereby the hooked-portion of each J embraces a body of rubber, indicated at 15, 15 in Figure 5, which automatically becomes displaced from the tread when it wears down to the top of the upwardly extended end of hook-like portion 14a. This provides grooves, indicated at 16, 16 in Figures 5 and 6, for providing additional anti-skid edges and increased flexibility in the ribs or other projections constituting the worn tread. As an incident to this construction, the hooked portion of the J being continuous with the trunk and extending to one side thereof tends to prevent crack-propagation, which is a problem in slitted tire treads. The hooked portions 14a may be formed so that the groove it defines will be undiminishing in width outwardly toward the terminal ends thereof, so that the rubber embraced in said portions will be readily displaced when the tread wears down, as described, and so that the tread will continue to wear inwardly of said terminal ends of the hooked portion without leaving rough or feathered anti-skid edges on the ribs.

Until the tread wears down an amount sufficient that the bodies of rubber 15 within the hooked portions 14a become displaced, the bodies 15 will effectively carry the load and distribute the same to the carcass, thereby stabilizing the tread.

As shown in Figure 7, the J-slit formed in the tread 20, as indicated at 21, may have a squared arm or hooked portion 22 instead of the rounded hooked portion shown in Figures 1 to 6, in which case the grooves automatically formed by the displacement of rubber embraced within the hooked portion of the J will be square-bottomed in the worn tread, rather than round-bottomed as indicated in Figures 5 and 6. The bottom of the groove defining the circumferential ribs in the tread is indicated at 23 in Figure 7.

Figure 8:
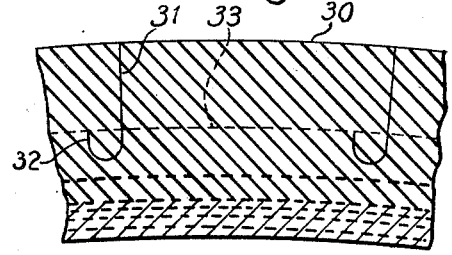
Figure 8 is a view similar to Figure 4 showing a J-slit in which hooked portions of the J extend below the grooves which define the ribs or projections, which is another way in which the invention may be embodied in a tire.

Referring to Figure 8, the J-slits 31 in the tire tread 30 may have their trunks extended down through the ribs or projections, and the hooked portions of the J, indicated at 32, may be extended into the rubber inwardly of or beneath the bottoms of the grooves defining the ribs or projections, the bottoms of the circumferential grooves being indicated at 33 in Figure 8. In this construction the ribs or projections will be transversely slitted throughout their depth by the trunk 31 of the J, and grooves will be formed across the entire width of the tread by displacement of the rubber embraced in the hooked portion 32, after the ribs or projections have become completely worn off the tread.

Figure 9:
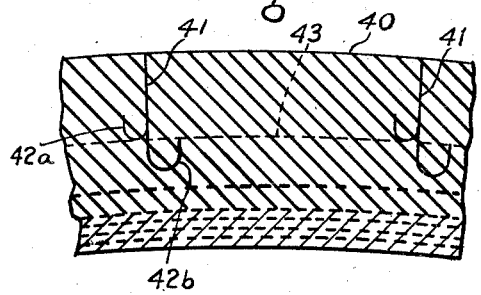
Figure 9 is a similar view showing a double-hooked J or inverted T-shaped slit in which one hooked portion of the J or T is above the bottoms of the grooves defining the ribs or projections and the other hooked portion is below the grooves.

By the use of the inverted T or double hooked J-slits shown in Figure 9, the tread 40 will be slitted all the way through the ribs or projections by the trunks of the J's or T's 41, and one hooked portion 42a of each J or T, arranged above the bottoms of the grooves indicated by the line 43, will embrace portions of rubber which will be displaced when the ribs or projections have worn a fraction of their depth to form transverse grooves across the ribs or projections. The other hooked portion 42b of each double-hooked J or T, extends into the rubber of the tread inwardly of or beneath the bottoms of the grooves which define the ribs or projections, to embrace portions of rubber which will be automatically displaced to form transverse grooves extending across the width of the tread, and thereby providing anti-skid and traction qualities even after the tread ribs or projections have been completely worn off the tread.

Figure 10:
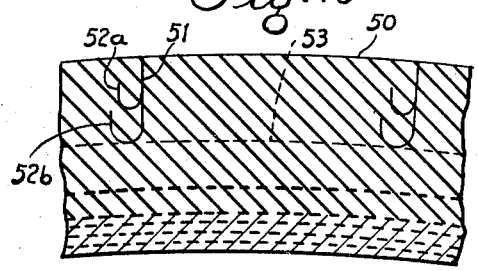
Figure 10 is a similar sectional view of a double-hooked J with one arm arranged a fractional part of the depth of the ribs or projections and the other arm extending down to the full depth of the ribs or projections.

The modification of the invention shown in Figure 10 comprises a tire having a tread 50 with double-hooked J-slits 51 having one arm or hooked portion 52a formed thereon a fraction of the depth of the ribs or projections to embrace bodies of rubber, which automatically will be displaced when the tread has worn off a fraction of the depth of the ribs to form transverse grooves across the ribs. These transverse grooves may be relatively narrow so as not to make the worn ribs too flexible at this point. The other hooked portion 52b of each J-slit may extend to the bottoms of the grooves, indicated at 53, defining the ribs or projections, the hooked portions 52b of the slits embracing, if desired, somewhat larger bodies of rubber, which will be automatically displaced to form somewhat wider grooves in the ribs as the latter wear off through the remainder of their depths to increase the flexibility of the tread during the latter portion of the wearing life thereof.

Figure 11:
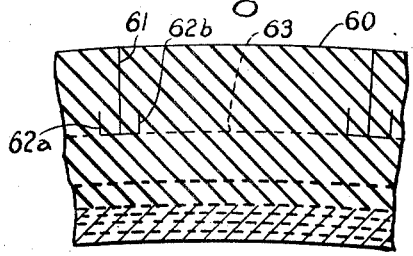
Figure 11 is a similar section showing a double-hooked J or inverted T slit with both the hooked portions of the J or T extending down to the bottoms of the grooves defining the ribs or projections.

Figure 11 illustrates double-hooked J or inverted T shaped slits 61 in the tread 60, which may extend to the bottoms of the grooves forming the projections, the line of the bottom of the grooves being indicated at 63, and which may have hooked portions 62a and 62b on opposite sides of the trunks of the slits 61, whereby when the tread wears down to the terminal ends of the hooked portions 62a and 62b the bodies of rubber embraced by both hooked portions 62a and 62b will automatically be displaced to form grooves of considerable width extending across the worn ribs.

Figure 12:
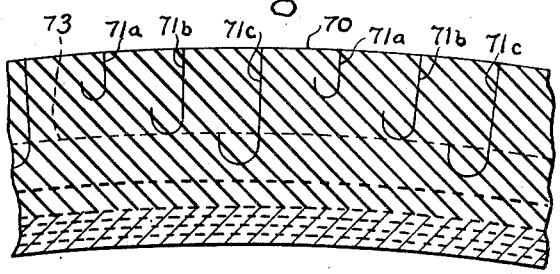
Figure 12 is a similar sectional view showing circumferential series of J-shaped slits, the hooked portions of the J's of the series being extended to varying depths in the tread and being of varying widths according to depth.

In Figure 12 is shown still another form of the invention, in which the tread 70 has series of circumferentially spaced J-shaped slits 71a, 71b, 71c, extending inwardly to increasingly greater depths, substantially as shown. The hooked portion of slit 71a may extend to a fraction of the depth of the ribs or projections, hooked portions of slits 71b to the bottom of the grooves, indicated at 73, defining the tread ribs, while hooked portions on slits 71c may extend inwardly of the bottom 73 of the circumferential grooves. The hooked portions of slits 71a, 71b and 71c preferably are of increasingly greater widths, respectively, according to the depths thereof, so as to provide transverse grooves of progressively increasing widths as the tread wears down, and thereby providing correspondingly increasing flexibility in the tread projections as desired.

It will be apparent that numerous other forms and arrangements of J or inverted T slits may be employed within the spirit of the present invention and the scope of the appended claims to attain the purposes of this invention, and that in all forms of the invention rubber embraced in the hooked portions of the J-slits or T-slits will be displaced during the wear of the tire, automatically to form anti-skid grooves and projections providing improved traction to maintain substantially the anti skid and traction qualities of a new tire until or after the normal anti-skid zone of the tread has been worn from the tire. It will also be apparent that, transversely extending J-slits or T-slits may be formed in tires having otherwise smooth tread surfaces, that is, tires not having tread ribs or projections, as shown in Figure 1, for example, whereby transversely extending anti-skid ribs will be provided between successive J-slits. In such case, when the tread wears down, in the manner best illustrated in Figure 5, the rubber embraced in the hooked portions of the slits will be displaced, automatically to form anti-skid grooves defining ribs extending transversely the full width of the tire tread. Furthermore, it is understood that the transverse slits may extend angularly across the tread, rather than co-axially of the tire as shown generally throughout the drawings.

Modifications other than those disclosed herein may therefore be resorted to without departing from the spirit or scope of the present invention.

What is claimed is:

1. A pneumatic tire having a tread including one or more ribs or projections, said ribs or projections having circumferentially spaced transverse slits extending radially inwardly at an angle to the ground-engaging surface of the tire, said slits being substantially J-shaped with hook-like portions turned radially outwardly and terminating in inwardly spaced relation to said ground-engaging surface, the rubber embraced by the hook-like portions of the J-slits being present in the tread during the initial wear of the tire to carry and distribute the load to the carcass of the tire, but being adapted automatically to be displaced from the tread when the tire wears down to said hook-like portions.

2. A pneumatic tire having a tread including one or more circumferentially extending ribs defined by grooves in said tread, said ribs having circumferentially spaced transverse slits extending radially inwardly at an angle to the ground-engaging surface of the tire, said slits being substantially J-shaped with hook-like portions turned radially outwardly and terminating in inwardly spaced relation to said ground-engaging surface, the bottoms of said hook-like portions extending to the depths of the grooves defining the ribs, the rubber embraced by the hook-like portions of the J-slits being present in the tread during the initial wear of the tire to carry and distribute the load to the carcass of the tire, but being adapted automatically to be displaced from the tread when the tire wears down to said hook-like portions.

3. A pneumatic tire having a tread including one or more circumferentially extending ribs defined by grooves in said tread, said ribs having circumferentially spaced transverse slits extending radially inwardly at an angle to the ground-engaging surface of the tire, said slits being substantially J-shaped with a hook-like portion turned radially outwardly and terminating in inwardly spaced relation to said ground-engaging surface, the bottoms of said hook-like portions extending inwardly or beneath the bottoms of said grooves, the rubber embraced by the hook-like portions of the J-slits being present in the tread during the initial wear of the tire to carry and distribute the load to the carcass of the tire, but being adapted automatically to be displaced from the tread when the tire wears down to said hook-like portions.

4. A pneumatic tire having a tread including a plurality of spaced circumferentially extending ribs or projections having circumferentially spaced slits extending radially inwardly at an angle to the ground-engaging surface of the tire, said slits having a plurality of hook-like portions turning outwardly and terminating in inwardly spaced relation to said ground-engaging surface, said hook-like portions of the respective slits being in radially spaced relation to each other, the rubber embraced by the hook-like portions of the slits being present in the tread during the initial wear of the tire to carry and distribute the load to the carcass of the tire, but being adapted automatically to be displaced from the tread when the tire wears down to said hook-like portions.

5. A pneumatic tire having a tread including a plurality of spaced circumferentially extending ribs or projections, said ribs or projections having circumferentially spaced slits extending radially inwardly at an angle to the ground-engaging surface of the tire, each of said slits having a plurality of hook-like portions turning outwardly and terminating in inwardly spaced relation to said ground-engaging surface, said hook-like portions of the respective slits being in radially spaced relation to each other and being of varying proportions at different depths from said ground-engaging surface, the rubber embraced by the hook-like portions of said slits being present in the tread during the initial wear of the tire to carry and distribute the load to the carcass of the tire, but being adapted automatically to be displaced from the tread when the tire wears down to said hook-like portions.

6. A pneumatic tire having a tread including one or more circumferentially extending ribs or projections, said ribs or projections having circumferentially spaced transverse slits extending radially inwardly at an angle to the ground-engaging surface of the tire, each of said slits branching at the inner end thereof to form oppositely disposed hook-like portions turned radially outwardly and terminating in inwardly spaced relation to said ground-engaging surface, the rubber embraced by the hook-like portions of said slits being present in the tread during the initial wear of the tire to carry and distribute the load to the carcass of the tire, but being adapted automatically to be displaced from the tread when the tire wears down to said hook-like portions.

7. A pneumatic tire having a tread including one or more circumferentially extending ribs or projections, said ribs or projections having circumferentially spaced transverse slits extending radially inwardly at an angle to the ground-engaging surface of the tire, each of said slits having hook-like portions branching from opposite sides thereof at varying distances from said ground-engaging surface, the ends of said hook-like portions terminating in inwardly spaced relation to said ground-engaging surface, the rubber embraced by said hook-like portions of the slits being present in the tread during the initial wear of the tire to carry and distribute the load to the carcass of the tire, but being adapted automatically to be displaced from the tread when the tire wears down to said hook-like portions.

8. A pneumatic tire having a tread including one or more circumferentially extending ribs or projections, said ribs or projections having circumferentially spaced transverse slits extending radially inwardly at an angle to the ground-engaging surface of the tire, each of said slits having hook-like portions branching from opposite sides thereof at varying distances from said ground-engaging surface, the ends of said hook-like portions terminating in inwardly spaced relation to said ground-engaging surface, said hook-like portions of each slit being in radially spaced relation to each other, the rubber embraced by the hook-like portions of the slits being present in the tread during the initial wear of the tire to carry and distribute the load to the carcass of the tire, but being adapted automatically to be displaced from the tread when the tire wears down to said hook-like portions.

9. A pneumatic tire having a tread including one or more circumferentially extending ribs or projections, said ribs having circumferentially spaced transverse slits extending radially inwardly at an angle to the ground-engaging surface of the tire, said slits being substantially J-shaped with hook-like portions turned radially outwardly and terminating in inwardly spaced relation to said ground-engaging surface, said hook-like portions being substantially undiminishing in width outwardly toward the terminal ends thereof, the rubber embraced by the hook-like portions of the J-slits being present in the tread during the initial wear of the tire to carry and distribute the load to the carcass of the tire, but being adapted automatically to be displaced from the tread when the tire wears down to said hook-like portions.

10. A pneumatic tire having a tread formed with anti-skid and traction projections and having circumferential series of transverse slits extending radially inwardly at an angle to the ground-engaging surface of the tire, said slits being substantially J-shaped with hook-like portions turned radially outwardly and terminating in inwardly spaced relation to said ground-engaging surface, successive J-slits of said series extending inwardly to varying depths, the rubber embraced by the hook-like portions of the J-slits being present in the tread during the initial wear of the tire to carry and distribute the load to the carcass of the tire, but being adapted antomatically to be displaced from the tread when the tire wears down to said hook-like portions.

11. A pneumatic tire having a tread formed with anti-skid and traction projections and having circumferential series of transverse slits extending radially inwardly at an angle to the ground-engaging surface of the tire, said slits being substantially J-shaped with hook-like portions turned radially outwardly and terminating in inwardly spaced relation to said ground-engaging surface, successive J-slits of said series extending inwardly to varying depths, the hook-like portions of said J-slits being of increased widths in proportion to the increased depths thereof, the rubber embraced by the hook-like portions of the J-slits being present in the tread during the initial wear of the tire to carry and distribute the load to the carcass of the tire, but being adapted automatically to be displaced from the tread when the tire wears down to said hook-like portions.

12. A pneumatic tire having a tread portion, said tread portion having circumferentially spaced transverse slits extending radially inwardly at an angle to the ground-engaging surface of the tire, said slits being substantially J-shaped with hook-like portions turned radially outwardly and terminating in inwardly spaced relation to said ground-engaging surface, the rubber embraced by the hook-like portions of the J-slits being present in the tread during the initial wear of the tire to carry and distribute the load to the carcass of the tire, but being adapted automatically to be displaced from the tread when the tire wears down to said hook-like portions.

HARRY P. SCHRANK.